United States Patent [19]

Neuendorf

[11] Patent Number: 5,297,669
[45] Date of Patent: Mar. 29, 1994

[54] METHOD AND APPARATUS FOR CONVEYING CURVED GLASS SHEETS

[75] Inventor: H. Christoph Neuendorf, Toledo, Ohio

[73] Assignee: Libbey-Owens-Ford Co., Toledo, Ohio

[21] Appl. No.: 4,445

[22] Filed: Jan. 14, 1993

[51] Int. Cl.⁵ .............................................. B65G 13/02
[52] U.S. Cl. .................................................... 198/782
[58] Field of Search ......................................... 198/782

[56] References Cited

U.S. PATENT DOCUMENTS

| | | |
|---|---|---|
| 3,048,214 | 8/1962 | Madge et al. .................. 198/782 X |
| 3,978,974 | 9/1976 | Morrissey et al. ................ 198/782 |
| 3,990,570 | 11/1976 | Mercier et al. .................... 198/782 |
| 4,905,817 | 3/1990 | Limbach et al. ............... 198/782 X |
| 4,907,632 | 3/1990 | Reuter ............................ 198/782 X |
| 4,921,091 | 5/1990 | Kehlenbach ........................ 198/782 |

Primary Examiner—D. Glenn Dayoan
Attorney, Agent, or Firm—Marshall & Melhorn

[57] ABSTRACT

A roll conveyor system for conveying glass sheets having a reverse bend curvature. The bent sheets are advanced along a horizontal path with the reverse bend portion at the trailing end. The sheets are initially positioned on the novel conveyor system with the major portion of the sheet supported on the rolls and the downwardly extending edge of the reverse bend portion disposed between a pair of adjacent rolls and below the supporting surface thereof. The opposite ends of each roll are operably connected to fluid actuators for raising and lowering the roll between an upper sheet supporting attitude and a lower non-supporting attitude. As the sheet is advanced along the conveyor system each roll is lowered in succession as the downwardly extending edge of the reverse bend portion approaches to avoid contact therewith. The lowered rolls are returned to the upper sheet supporting attitude after the sheet has past.

10 Claims, 4 Drawing Sheets

METHOD AND APPARATUS FOR CONVEYING CURVED GLASS SHEETS

BACKGROUND OF THE INVENTION

The present invention pertains generally to the production of curved or bent sheets of glass and, more particularly, to an improved method of and apparatus for conveying glass sheets having a reverse bend curvature.

DESCRIPTION OF THE PRIOR ART

Curved or bent sheets of glass are commonly employed as glazing closures in vehicles such as automobiles and the like. The configuration of the bent sheets is determined by styling considerations in designing the vehicles. It is often desirable to shape the glass in a manner to carry out styling features found in the adjacent sheet metal components in order to create the appearance of unity between the glass and the sheet metal. For example, in current aerodynamic designs, the automotive backlight will oftentimes have a so-called S-shape or reverse bend curvature which gradually merges at its upper and lower ends into the roof line of the vehicle as well as the deck lid, respectively. Likewise, the automotive windshield may be provided with a similar S-shape configuration for continuing the aerodynamic styling between the roof line and cowl portion at the forward end of the vehicle.

Such complex curved or bent sheets are now generally produced by press bending techniques wherein flat glass sheets are heated to the softening point of the glass and then pressed or shaped to the desired curvature between male and female mold members having complementary shaping surfaces. After bending, the sheets are cooled in a controlled manner to either anneal or temper the glass as dictated by their intended end use. Such press bending may suitably be carried out with the sheets oriented vertically, horizontally or obliquely.

When producing curved sheets in a horizontal system, generally, the sheets are supported and conveyed on a continuous roll conveyor through the furnace, the press bending station and the cooling station. In the press bending station, the heated glass sheet typically is lifted from the rolls by the lower mold member into pressing engagement with the upper mold member wherein the sheet is shaped to the desired curvature between the complementary shaping surfaces. The curved sheet is then returned to the conveyor rolls by the lower mold member for advancement into the cooling station. Generally, the major surfaces of the sheet have cooled sufficiently at this time to set the curvature and avoid any flattening thereof as the sheet advances on the rolls.

Automotive glazing closures having an S-shape or reverse bend curvature typically are carried on the roll conveyor with the outboard surface engaging the rolls and the reverse bend portion upstream the direction of travel. As the sheet is being conveyed, the downwardly extending trailing edge of the reverse bend portion is repeatedly urged upwards as it contacts each subsequent roll creating sufficient force in the early stages of travel to cause a flattening effect to the curve even though the overall curvature is substantially set. This is especially noticeable when producing thinner glass in the order of 3 mm (0.118 in) or less, for example. While on some occasions this flattening effect can be compensated for by making adjustments to the shaping surfaces of the mold members this does not always achieve the desired end results.

SUMMARY OF THE INVENTION

The present invention overcomes the above-noted shortcomings by providing a novel roll conveyor system for conveying reversely bent sheets of glass while at a temperature susceptible to deformation along a generally horizontal path without adversely affecting the curvature of the sheets. The conveyor system comprises a series of aligned conveyor rolls that transfer the heated glass sheet from the bending station to the cooling station. Each roll is mounted for reciprocating movement between an elevated position to support and advance the sheet along the generally horizontal path and a lowered position to avoid contact with the downwardly extending reverse bend portion of the sheet as it moves therealong. The rolls are individually controlled and programmed to lower in sequence as the reverse bend portion approaches each roll. The lowered rolls can be sequentially or simultaneously returned to the elevated position after the glass sheet has advanced past each roll or series of rolls.

It is therefore a primary object of the present invention to provide an improved roll conveyor system for conveying glass sheets having a downwardly extending curve portion.

Another object of the invention is to provide such a conveyor system for conveying heated glass sheets with a downwardly extending curve portion that is susceptible to deformation without adversely affecting the curvature.

Still another object of the invention is to provide such a conveyor system in which each conveyor roll is lowered in sequence as the downwardly extending curve portion approaches so as to avoid contact therewith.

Other objects and advantages will become more apparent during the course of the following description when taken in connection with the accompanying drawings.

BRIEF DESCRIPTION OF THE DRAWINGS

In the drawings, wherein like numerals refer to like parts throughout.

DETAILED DESCRIPTION OF THE PREFERRED EMBODIMENT

Figure 1:
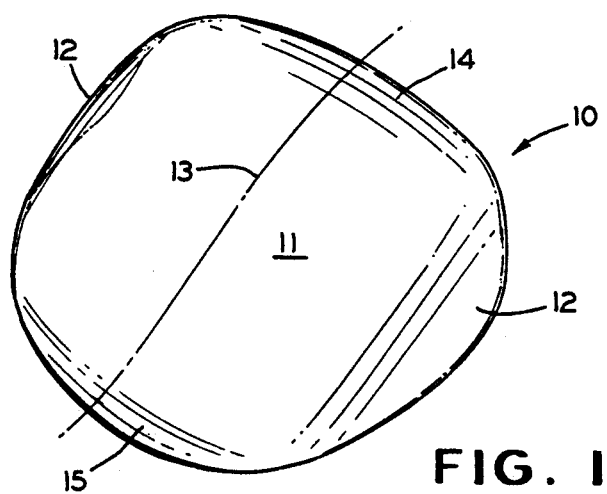
FIG. 1 is a perspective view of an automobile glazing closure having a generally S-shape configuration.

With reference now to the drawings, there is illustrated generally at 10 in FIG. 1 a glazing closure bent to the desired configuration for its intended use as a backlight in an automotive vehicle. The backlight 10 is comprised of a monolithic glass sheet having a central body portion 11 and inturned opposite end or side portions 12. The central body portion 11 is formed with a slight or gradual convex curvature about a Central transverse axis 13 that merges into a slightly convexly curved upper portion 14 and a reversely bent, concavely curved lower portion 15. The convexly curved upper portion 14 is adapted to merge into the roof line of the vehicle when installed while the lower concavely curved lower portion 15 merges into the deck lid and forms a part thereof to create the appearance of unity between the glass and the sheet metal of the vehicle body. While the method and apparatus of the invention will be described in the connection with the production of a single glass sheet for a backlight having a reverse bend curvature, it should be understood that the principles of the invention are equally applicable in the production of other automobile glazing closures having a reverse bend curvature such as laminated windshields, for example, having multiple layered sheets of glass. Likewise, the present invention has utility in the production of reversely curved glass sheets and the like, for use in other industries such as aircraft and architectural, for example.

Figure 2:
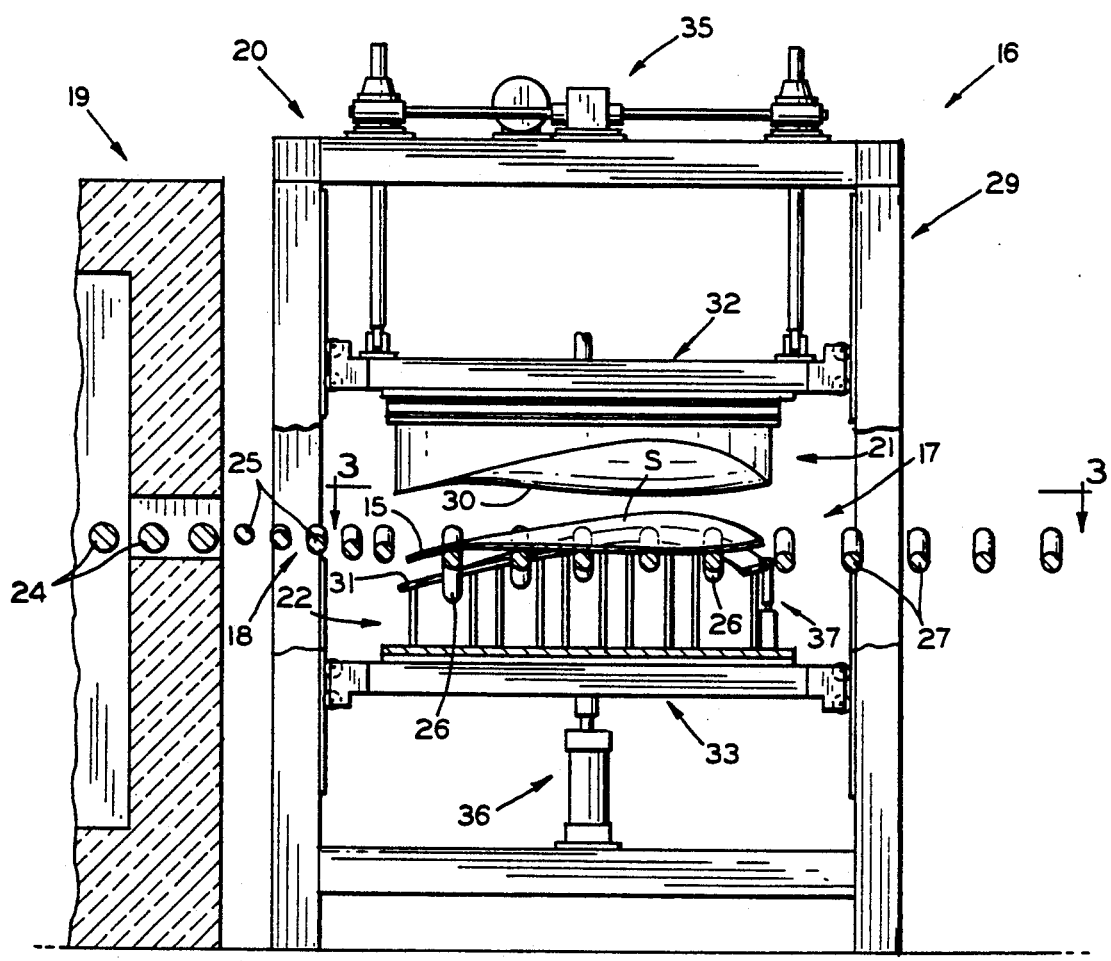
FIG. 2 is a side elevational view of a press bending apparatus incorporating the novel conveyor system of the present invention.
Figure 3:
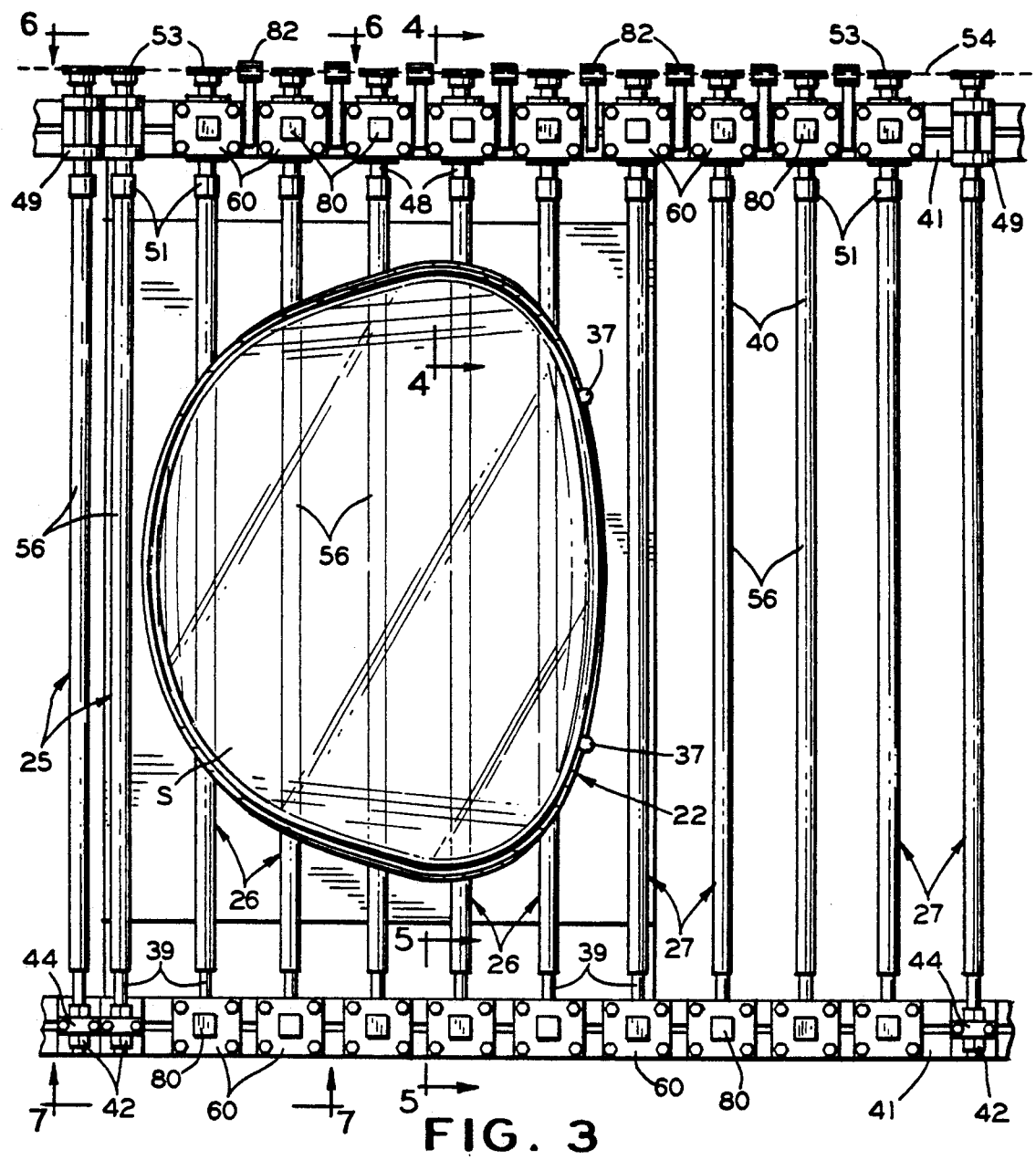
FIG. 3 is a plan view looking in the direction of arrows 3—3 of FIG. 2.
Figure 6:
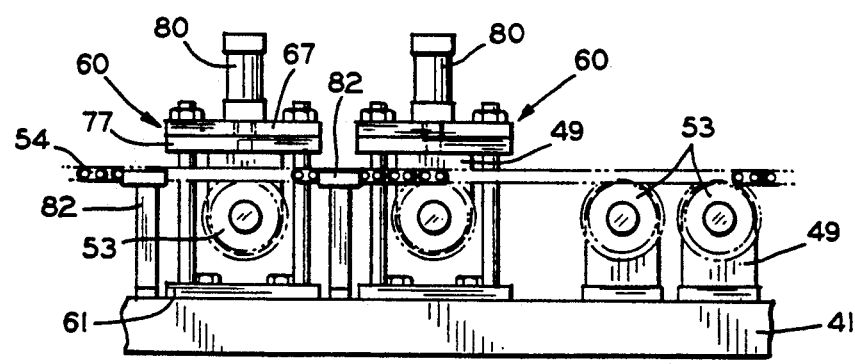
FIG. 6 is an enlarged side elevational view looking in the direction of arrows 6—6 of FIG. 3 showing the roll mounting arrangement at the drive side of the conveyor system.

Referring now to FIG. 2 there is illustrated a conventional horizontal press bending apparatus, identified generally at 16, incorporating the novel conveyor section of the invention comprehensively designated 17. The apparatus 16 more particularly includes a continuous conveyor system 18 for supporting and conveying glass sheets S along a generally horizontal path through a heating furnace 19 for heating the sheets to their softening point or bending temperature, a press bending station 20 whereat the sheets are bent to the desired shape between upper and lower press members 21 and 22 respectively, and thereafter to a cooling station (not shown) whereat the heated bent sheets are appropriately tempered or annealed as desired.

The conveyor system 18 typically, is comprised of a first series of rolls 24 for carrying the sheet through the furnace, a second series of rolls 25 disposed between the furnace and the press members, a third series of rolls 26 that extend through the lower press member 22, and a fourth series of rolls 27 disposed downstream of the press members for advancing the bent sheets to the appropriate cooling station (not shown). The rolls 25 and 26 are commonly referred to as prepress and press rolls, respectively, while the rolls 27 are referred to as post press rolls. The novel conveyor section 17 of the present invention, as will be hereinafter more fully described, is incorporated into the conveyor system 18 and is intended to support and convey the glass sheet after bending while it is at a temperature susceptible to deformation under adverse conditions.

The press bending station 20 comprises a skeletal framework 29 within which is mounted the upper and lower press members 21 and 22. The press members typically include an upper shaping element 30 and a lower shaping rail 31 provided with complemental shaping surfaces conforming to the curvature to which the sheets are to be bent and are mounted for vertical reciprocating movement toward and away from one another on upper and lower platen frames 32 and 33, respectively. To this end, the upper platen frame 32 is operably connected to a motorized drive unit 35 carried atop the framework 29 for raising and lowering the platen frame 32 and the upper press member 21 carried thereby. The lower platen frame 33 is operably connected to a fluid actuator 36 mounted at the lower end of the skeletal framework 29 for raising and lowering the lower platen frame 33 and press member 22. The drive unit 35 is used to either position the upper press member 21 at a fixed elevation for bending or it can be employed to alternately raise and lower the press member 21 between the rest and press bending elevations in the bending cycle.

In a typical press bending operation, a suitable detection device (not shown) senses the entry of a glass sheet into the bending station 20 for initiating a bending cycle by energizing timing mechanisms (not shown) which control the actions of the drive unit 35 when employed, the fluid actuator 36 and a sheet locating mechanism 37 which accurately positions the sheet S in the desired location relative to the lower press member 22. The timing mechanisms are so designed that the lower press member 22 begins its ascent by actuation of fluid actuator 36 and the shaping rail 31 engages the glass sheet just about the time the leading edge thereof engages the sheet locating mechanism 37. The shaping rail 31 lifts the sheet from the press rolls 26 as the press member 22 continues upwardly until it reaches the end of its upstroke or the "upper dwell" position, pressing the glass sheet between the shaping surfaces of the opposed shaping element 30 and shaping rail 31 to impart the desired configuration thereto. After the sheet is formed, the lower press member 22 with the bent sheet resting on the shaping rail 31, is lowered a short distance from the upper shaping surface and pauses for a brief period of time to allow the sheet to cool to substantially set the curvature therein. The press member 22 is then lowered below the rolls 26 to deposit the bent sheet thereon for advancement out of the press area.

Proper sequencing of the operation of the drive unit 35, fluid actuator 37 and locating mechanism 37, as well as the variation of speed imparted to the several series of conveyor rolls 24, 25, 26, and 27, for effecting the forgoing operations in a cyclic, timed relationship is effected by conventional limit switches and/or by conventional timers incorporated in the electrical control system (not shown). Each of these switches and/or timers triggers subsequent stages of the operation of various actuators and conveyor roll drives and since such sequentially operable switches and timing arrangements are known and, per se, form no part of the present invention, no detailed description thereof is believed necessary.

The conveyor rolls 25, 26 and 27 are preferably of the contoured type comprising an inner, hollow, stationary core member and an outer, flexible, load carrying sleeve rotatable thereabout. Such contoured conveyor rolls are disclosed and described in U.S. Pat. No. 3,905,794 which is incorporated herein by reference. The construction of the roll per se does not constitute part of the present invention, and reference may be had to the patent for details of a preferred form of core member and rotatable sleeve.

Figure 4:
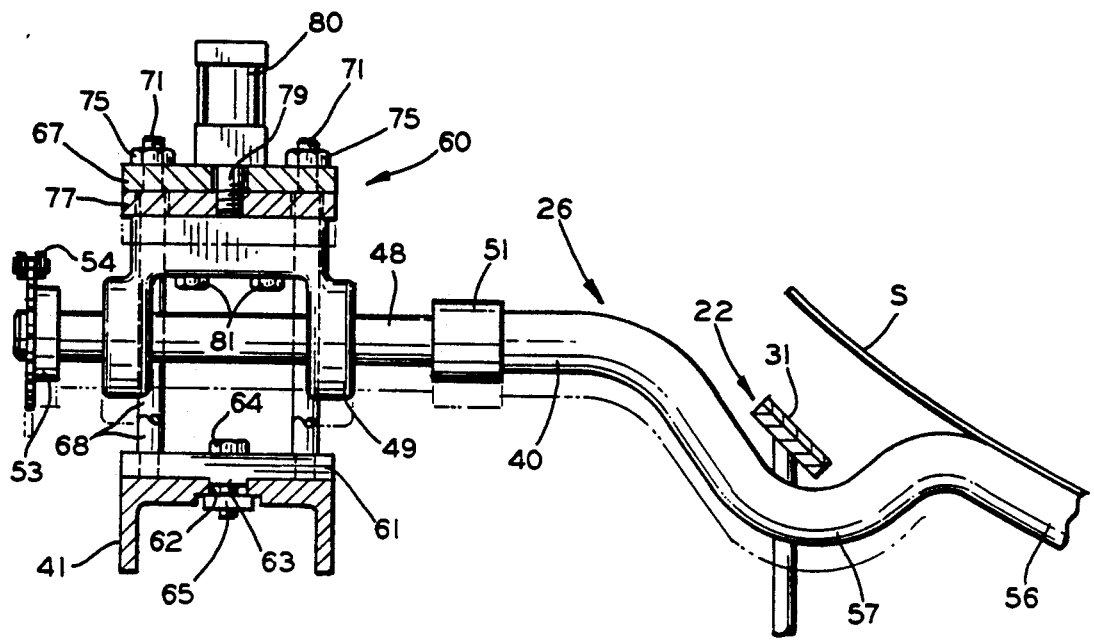
FIG. 4 is an enlarged sectional view taken substantially along line 4—4 of FIG. 3 showing the drive side of one of the conveyor rolls of the invention with parts broken away for the sake of clarity.
Figure 5:
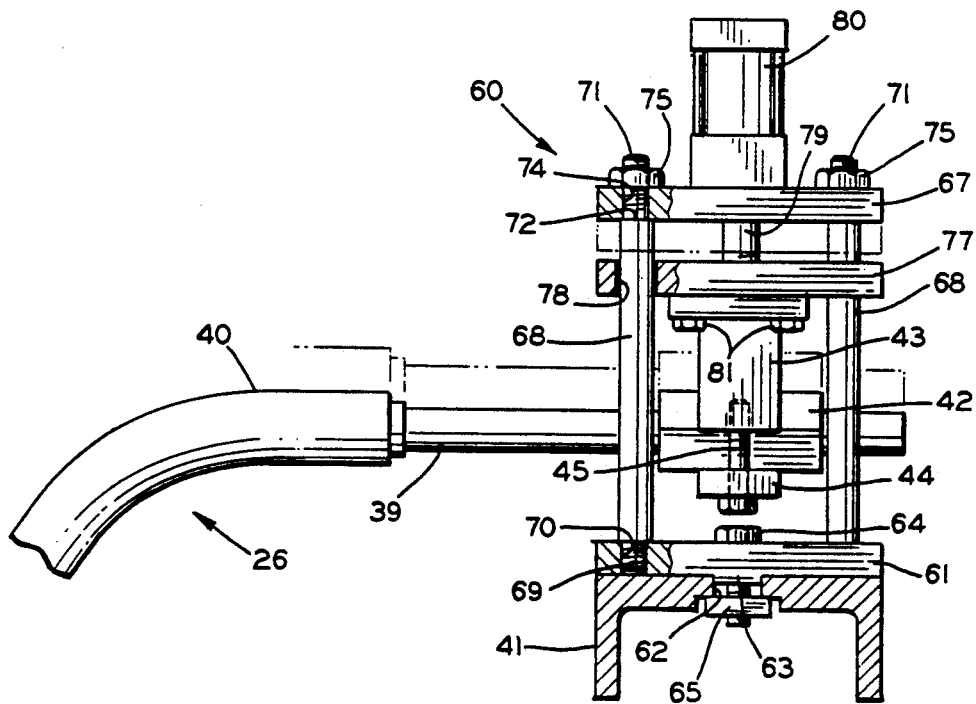
FIG. 5 is an enlarged sectional view taken substantially along line 5—5 of FIG. 3 showing the idle side of one of the conveyor rolls of the invention with parts broken away for the sake of clarity.
Figure 7:
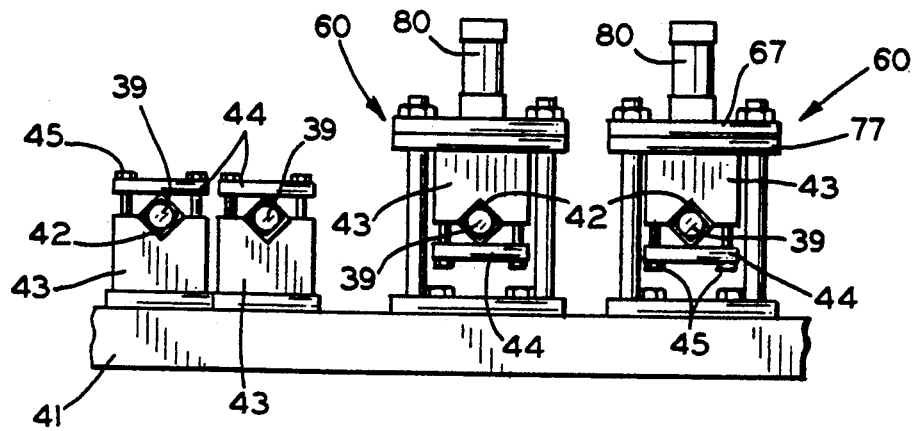
FIG. 7 is an enlarged side elevational view looking in the direction of arrows 7—7 of FIG. 3 showing the roll mounting arrangement at the idle side of the conveyor system.

As best shown in FIGS. 3-7, the contoured conveyor rolls include a core member 39, for example, of stainless steel tubing and an outer flexible, load carrying sleeve 40 surrounding and freely rotatable about the inner core member. At one end of the contoured rolls the stationary core member 39 extends beyond the end of the rotatable sleeve 40 and is secured against rotation by suitable mounting means carried upon a side rail 41 of the structural framework. To that end, as best shown in FIGS. 5 and 7, a short section 42 of square tubular stock is affixed as by welding about the core member 39 and secured in a correspondingly shaped notch of a mounting block 43 by means of a clamping plate 44 and fasteners 45. The mounting blocks 43 of the conventionally mounted rolls are affixed in an upright position upon the side rail 41 while the mounting blocks 43 of the conveyor rolls of the novel conveyor section 17 of the invention, as will be hereinafter more fully explained, are mounted for vertical movement in an inverted position upon the side rail 41.

At its other or driving end, the core member 39 telescopingly receives a stub shaft (not shown) which is fixed to the core member and concentrically journalled within a rotatable collar 48. The collar 48 is journalled for rotation in a bearing assembly 49 carried on a side rail 41 on the opposite side of the structural framework. The end of the outer sleeve 40 is attached to the rotatable collar 48 by a coupling member 51 fixedly secured on the collar. A pinion 53, adapted to be driven by a suitable endless drive chain 54, is rigidly secured on the collar 48. Driving of the pinion 53 by the drive chain 54 thus rotates the collar 48 about the stationary stub shaft affixed to the core member 39 and, in turn rotates the coupling member 51 so as to cause the outer sleeve 40 to rotate about the core member. The bearing assemblies 49 of the conventionally mounted rolls are affixed in an upright position upon the side rail 41 while the bearing assemblies of the conveyor rolls of the invention are mounted for vertical movement in an inverted position upon the side rail 41, in a manner similar to the opposed mounting blocks 43.

The conveyor rolls 25, 26 and 27 include a generally concave central portion 56 which engages the lower surface of the sheet as it advances from the exit end of the furnace into the cooling station. The curved central portions 56 of the prepress and press rolls 25 and 26, respectively, are of a progressively increasing curvature from the exit end of the furnace into the press bending area to gradually preform the glass sheets prior to bending between the shaping surfaces of the opposed press members 21 and 22. The press rolls 26 are configured so as to permit unhindered operation of the lower or female press member 22. To that end, as best shown in FIG. 4, the rolls 26 include U-shaped portions 57 at opposite ends (only one end of which is shown) of the curved central portion 56 which pass beneath the shaping rail 31 of the press member 22 while in lowered position.

The central curved portions 56 of the press and post press rolls 26 and 27, respectively, conjointly define a curved supporting surface complementary to the curvature imparted to the sheet by the press bending members 21 and 22. Thus, when the bent sheet is returned to the conveyor rolls, the curvature imparted to the sheet is substantially continuously maintained during its course of travel from the bending station to the cooling station.

As previously mentioned, the glass sheet is allowed to cool briefly after bending to substantially set the curvature of the sheet to preclude the flattening thereof after the sheet is returned to the conveyor rolls. While this procedure has proven satisfactory for the production of glass sheets having a generally concave curvature it has been less than satisfactory when producing glass sheets having a reverse bend curvature such as the S-bend backlight and windshield. When these glass sheets are returned to the conveyor rolls after bending, the reverse bend portion 15 of the sheet S (FIG. 2) is at the trailing end and extends downwardly below the supporting surface of the conveyor rolls. As the sheet is advanced along the conveyor rolls the reverse bend portion 15 is urged upwards as it comes into contact with each succeeding roll. While the curvature of the sheet is substantially set at this time, this repetitious contact with the rolls combined with the resistance created by the weight of the glass sheet tends to have a flattening effect on the reverse bend portion 15.

The present invention alleviates this problem by providing a novel roll conveyor for reversely bent glass sheets that avoids contact between the reverse bend portion of the sheet and the conveyor rolls as it is being advanced along the rolls. Each conveyor roll is systematically lowered from a sheet supporting elevation to an elevation below the downwardly extending edge of the reverse bend portion of the sheet as the reverse bend portion approaches. Once the sheet advances beyond the conveyor roll, the roll can be returned to the sheet supporting elevation in readiness for the next sheet. The lowered conveyor rolls can be elevated either individually in sequence or simultaneously as a group after the curved sheet has passed.

Figure 8:
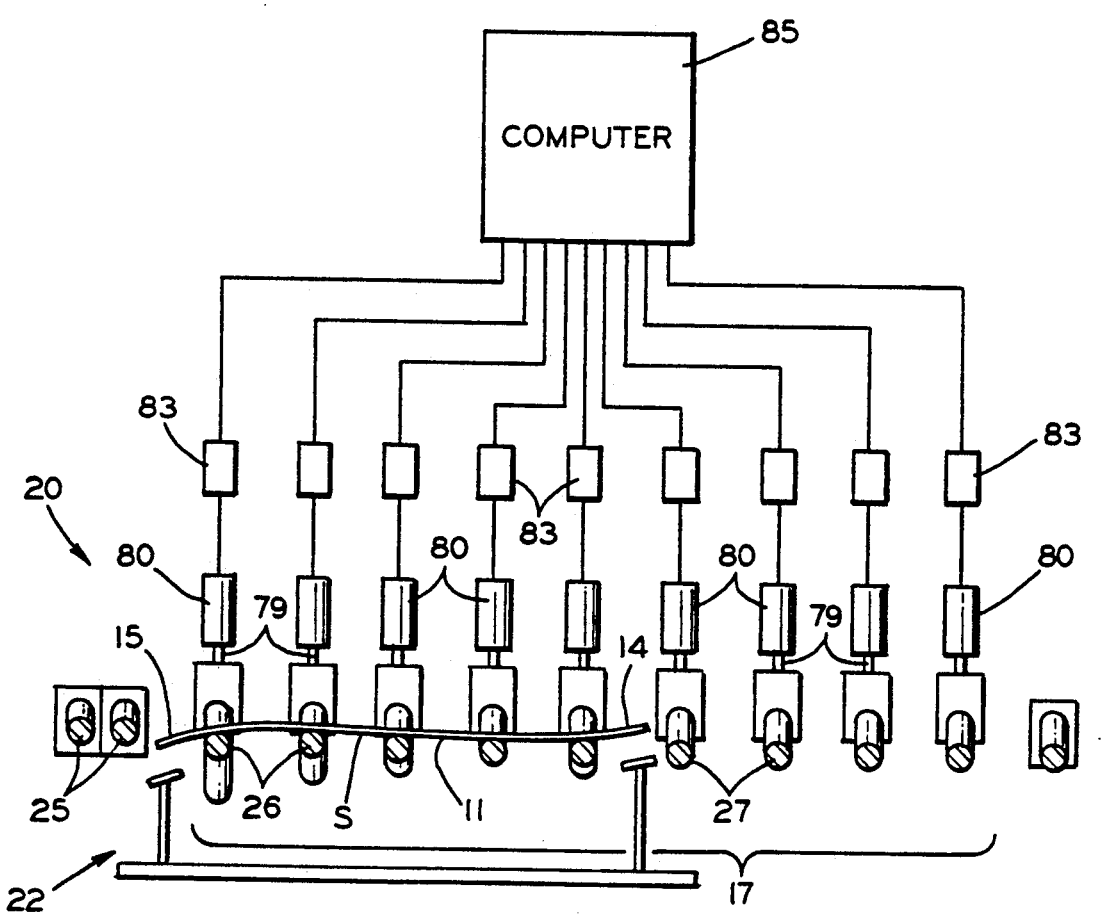
FIG. 8 is a schematic diagram of a control system for operating the novel conveyor section of the invention.

The novel conveyor section 17 of the invention as best shown in FIG. 8, includes the entire set of press rolls 26 and a predetermined number of the post press rolls 27. The number of rolls 27 utilized can vary and is generally determined by the distance the heated glass sheet is required to travel to cool sufficiently whereat the reverse bend portion is no longer effected by contact with the rolls. This distance is influenced by several factors such as glass composition, thickness and the overall size of the sheet, as well as conveyor speed and ambient temperature.

With reference to FIGS. 3-7, the rolls of the conveyor section 17 are supported at the opposite ends on roll mounting devices 60 which as will be hereinafter discussed, control the vertical displacement of the rolls. The mounting devices 60 include a base plate 61 that is adapted for mounting on a conventional bearing rail such as the side rails 41 having longitudinal slots 62. The base plate 61 is provided with a flat sided boss 63 appropriately proportioned to mate with the slot 62 to readily locate the base plate on the rail 41. One or more suitable fasteners such as a bolt 64 and nut 65, are employed to rigidly secure the base plate 61 to the rail.

An upper plate member 67 is affixed at a spaced relationship to the base plate 61 by vertical posts 68. The posts 68 are suitably attached at their opposite ends to the base plate 61 and plate member 67. To that end, as best shown in FIG. 5, the lowermost end of each post 68 is provided with external threads 69 for securement into an associated threaded bore 70 in the base plate 61. The opposite end of the post 68 is provided with an externally threaded reduced diameter portion 71 including a shoulder 72 for insertion through an associated bore 74 in the upper plate 67. The upper plate 67 rests on the shoulder 72 and is secured thereagainst by a locknut 75.

A mounting plate 77 for supporting the appropriate roll mounting means is interposed between the base plate 61 and upper plate 67. The plate 77 is provided with openings 78 in axial alignment with the posts 68 to permit sliding vertical movement of the plate 77 along the posts 68. The plate 77 (FIG. 4) is affixed to the distal end of the piston rod 79 of a fluid actuating cylinder 80 carried on top of the upper plate 67. The mounting blocks 43 and bearing assemblies 49 for supporting the opposite ends of the conveyor rolls 26 and 27 of the conveyor section 17 are secured in an inverted position to the respective mounting plates 77 by appropriate fasteners 81. Thus, the simultaneous activation of the fluid actuators 80 at the opposite ends of a conveyor roll will alternately raise and lower the roll between a sheet supporting and a non-supporting attitude. Chain support members 82 are appropriately disposed on the drive side of the conveyor rolls to maintain the drive chain 54 in its operative position as the rolls are lowered and the pinions 53 are disengaged from the chain.

There is shown in FIG. 8 a schematic representation of a control system for the operation of the fluid actuators 80. Since the fluid actuators on opposite ends of each conveyor roll operate in unison and are controlled in like manner, only the fluid actuators on one side of the conveyor section 17 are shown for the sake of convenience. Each of the fluid actuators 80 is connected to a suitable valve assembly 83 which is in turn connected to a source of compressed fluid (not shown), such as oil or the like. The valve assemblies 83 are connected to a central control unit such as a programmable computer 85. The computer generates electrical control signals to the valve assemblies 83 to control the application and venting of compressed fluid to the actuators so to extend and retract the piston rods 79 and associated roll mounting means.

The control signals are generated in response to a specific program designed for the glass sheet being processed. Several factors are integrated into the program including conveyor speed, roll spacing, timing sequence of the press cycle, and the curvature of the reverse bend portion of the glass sheet. The longitudinal length of the reverse bend portion relative to the path of travel is correlated with the distance between adjacent rolls and the speed of the conveyor to determine the proper sequencing of the control signals as the sheet is being transported out of the bending station. The start of the sequence is coordinated with the operation of the press and is programmed to begin as the glass sheet is returned to the conveyor rolls after bending between the opposed press members. The press cycle is initiated typically by a signal received from a sensing unit (not shown) located upstream of the bending station that detects the presence of a glass sheet entering the station.

At least the rolls 26 of the conveyor section 17 are in the elevated position with the central sheet supporting surfaces aligned with the sheet supporting surfaces of the rolls 25 as the bent glass sheet is returned to the conveyor rolls. Simultaneously with the sheet engaging the rolls 26, the programmed sequence of control signals which activate the fluid actuators 80 is energized. The first press roll 26 at the upstream end of the conveyor section 17 is lowered at this time positioning the central sheet supporting surface below the downwardly extending edge of the reverse bend portion 15 of the bent sheet. As the sheet is advanced along the conveyor section 17, each succeeding roll thereof is lowered in a similar manner as the reverse bend portion 15 approaches the roll. Thus, contact between the downwardly extending edge of the reverse bend portion 15 and the conveyor rolls is avoided while the glass sheet is susceptible to deformation. The lowered rolls can be programmed to return to the elevated position in succession as the sheet advances beyond the respective roll or one or more sets of rolls can be elevated simultaneously after the sheet has passed.

It is to be understood that the form of the invention herein shown and described is to be taken as a preferred embodiment only of the same, and that various changes in the size, shape and arrangement of parts, as well as various procedural changes may be made without departing from the spirit of the invention or the scope of the following claims.

What is claimed is:

1. A method of conveying a bent glass sheet having a first portion and a second portion terminating in a downwardly extending edge in a generally horizontal path on a series of longitudinally spaced conveyor rolls having aligned sheet supporting surfaces, comprising positioning said glass sheet on said longitudinally spaced conveyor rolls with said first portion downstream to the horizontal path and said second portion upstream to the horizontal path in a manner wherein said first portion is supported by a plurality of said aligned sheet supporting surfaces and the lowermost point of said downwardly extending edge of said second portion is disposed below said aligned sheet supporting surfaces, advancing said glass sheet on said longitudinally spaced conveyor rolls while systematically lowering each of said aligned sheet supporting surfaces in sequence below the lowermost point of said downwardly extending edge of said advancing glass sheet to preclude contact therewith.

2. A method of conveying a curved glass sheet having a first curved portion and a second curved portion terminating in a downwardly extending edge in a generally horizontal path on a series of longitudinally spaced conveyor rolls having aligned sheet supporting surfaces, comprising positioning said glass sheet on said longitudinally spaced conveyor rolls with said first curved portion downstream to the horizontal path and said second curved portion upstream to the horizontal path in a manner wherein said first curved portion is supported by a plurality of said aligned sheet supporting surfaces and the lowermost point of said downwardly extending edge of said second curved portion is disposed below said aligned sheet supporting surfaces, advancing said glass sheet on said longitudinally spaced conveyor rolls while systematically lowering each of said aligned sheet supporting surfaces in sequence below the lowermost point of said downwardly extending edge of said advancing glass sheet as said downwardly extending edge approaches each of said aligned sheet supporting surfaces to preclude contact therewith, and returning said lowered sheet supporting surfaces to the generally horizontal path after said downwardly extending edge has advanced downstream thereof.

3. A method of conveying a curved glass sheet as claimed in claim 2, wherein each of said sheet supporting surfaces is returned in succession to the generally horizontal path.

4. A method of conveying a curved glass sheet as claimed in claim 2, wherein a predetermined number of said lowered sheet supporting surfaces is simultaneously returned to the generally horizontal path.

5. A roll conveyor system for conveying in a generally horizontal path bent glass sheets each having a first leading edge portion and a second portion terminating in a downwardly extending edge, comprising a series of longitudinally spaced conveyor rolls having central sheet supporting surfaces, means mounting each of said rolls for independent vertical displacement from a first position in which said sheet supporting surfaces define said path to a lowered position below the path, and means individually programming and controlling said vertical displacement of each roll in sequence from said first position to said lowered position as said downwardly extending edges of the sheets approach each roll, whereby contact of said edges with said rolls is avoided, and then to return each roll to said first position after travel of said downwardly extending edges therepast.

6. A roll conveyor system as claimed in claim 5, wherein said conveyor system is supported by a framework including rail means extending along each side of the generally horizontal path, each end of each conveyor roll being affixed to said rail means by said mounting means which includes independent actuating means operably connected to the end of each said roll for effecting said independent vertical displacement of said roll.

7. A roll conveyor system as claimed in claim 6, wherein said mounting means includes a base member affixed to said rail means, a support plate, means for mounting said support plate for vertical movement relative to said base plate, means on said support plate for supporting the end of said roll, and said actuating means operably connected to said support plate for effecting vertical movement thereof.

8. A roll conveyor system as claimed in claim 7, wherein said mounting means includes an upper plate member mounted in spaced relationship to said base member and adapted for supporting said actuating means.

9. A roll conveyor system as claimed in claim 8, wherein said actuating means comprises a fluid actuating cylinder having a piston rod, the distal end of which is affixed to said support plate.

10. A roll conveyor system as claimed in claim 6, including means for operating said actuating means at the opposite ends of each said roll in unison to effect vertical displacement of the central sheet supporting surface of said roll.

* * * * *